(12) United States Patent
Sobolewski et al.

(10) Patent No.: US 12,294,608 B2
(45) Date of Patent: May 6, 2025

(54) GRAPHICAL RENDERING OF MALICIOUS WEB PAGES

(71) Applicant: Isolated Technologies, LLC, Sausalito, CA (US)

(72) Inventors: Phillip John Sobolewski, Charleston, SC (US); Mark Doyle, Aptos, CA (US)

(73) Assignee: Isolated Technologies, LLC, Sausalito, CA (US)

( * ) Notice: Subject to any disclaimer, the term of this patent is extended or adjusted under 35 U.S.C. 154(b) by 124 days.

(21) Appl. No.: 16/687,084

(22) Filed: Nov. 18, 2019

(65) Prior Publication Data

US 2020/0084226 A1    Mar. 12, 2020

Related U.S. Application Data

(63) Continuation of application No. 15/295,585, filed on Oct. 17, 2016, now Pat. No. 10,484,421, which is a
(Continued)

(51) Int. Cl.
| | |
|---|---|
| *H04L 9/40* | (2022.01) |
| *G06F 3/04842* | (2022.01) |
| *G06F 16/958* | (2019.01) |
| *G06F 21/53* | (2013.01) |
| *G06F 21/56* | (2013.01) |
| *G06F 21/74* | (2013.01) |

(52) U.S. Cl.
CPC ........ *H04L 63/145* (2013.01); *G06F 3/04842* (2013.01); *G06F 21/53* (2013.01);
(Continued)

(58) Field of Classification Search
CPC ........ G06F 16/986; G06F 21/53; G06F 21/56; G06F 21/568; G06F 21/74;
(Continued)

(56) References Cited

U.S. PATENT DOCUMENTS

| | | |
|---|---|---|
| 5,115,450 A | 5/1992 | Arcuri |
| 5,381,347 A | 1/1995 | Gery |

(Continued)

OTHER PUBLICATIONS

ISA/KR, International Search Report and Written Opinion for International Application No. PCT/US2011/064500, Jun. 25, 2012, 7 Pages.

*Primary Examiner* — Theodore C Parsons

(57) ABSTRACT

A method for prevention of malware infection of a user device. A first request for a first web page is received from the user device. Transmitting, to a website associated with the requested first web page and in response to the first request a second request for the first web page. In response to the second request, receiving a first set of data associated with the first web page. Generating, based on a first set of data in the first domain format, a first set of graphical images representing respective portions of the first set of data in a second domain format. Transmitting, to the user device, the first set of graphical images with correlation data configured to enable a user to interact with the graphical images on the user device in a manner that is substantially the same as though the user device had received the first web page in the first domain format and the first web page had been rendered from the first domain format by a program operating on the user device.

24 Claims, 8 Drawing Sheets

Related U.S. Application Data continuation of application No. 14/498,404, filed on Sep. 26, 2014, now Pat. No. 9,485,227, which is a continuation of application No. 13/197,651, filed on Aug. 3, 2011, now Pat. No. 8,875,273.

(60) Provisional application No. 61/459,748, filed on Dec. 17, 2010.

(52) U.S. Cl.
CPC ............ *G06F 21/56* (2013.01); *G06F 21/568* (2013.01); *G06F 21/74* (2013.01); *H04L 63/02* (2013.01); *H04L 63/1408* (2013.01); *G06F 16/986* (2019.01)

(58) Field of Classification Search
CPC . G06F 3/04842; H04L 63/02; H04L 63/1408; H04L 63/145
See application file for complete search history.

(56) References Cited

U.S. PATENT DOCUMENTS

| | | |
|---|---|---|
| 5,663,819 A | 9/1997 | Lewis |
| 5,808,329 A | 9/1998 | Jack et al. |
| 6,177,955 B1 | 1/2001 | Downen et al. |
| 6,545,623 B1 | 4/2003 | Yu |
| 6,734,860 B1 | 5/2004 | Potter et al. |
| 7,346,278 B2 | 3/2008 | Aronson et al. |
| 7,640,361 B1 | 12/2009 | Green et al. |
| 9,208,316 B1 | 12/2015 | Hill et al. |
| 10,320,809 B1 | 6/2019 | Alexander et al. |
| 2002/0040439 A1 | 4/2002 | Kellum |
| 2003/0229810 A1 | 12/2003 | Bango |
| 2005/0106543 A1 | 5/2005 | Day et al. |
| 2005/0206539 A1 | 9/2005 | Jeon et al. |
| 2006/0230452 A1* | 10/2006 | Field .................... G06F 21/562 726/22 |
| 2007/0182983 A1 | 8/2007 | Wyatt et al. |
| 2008/0212945 A1 | 9/2008 | Khedouri et al. |
| 2009/0013405 A1 | 1/2009 | Schipka |
| 2009/0158434 A1 | 6/2009 | Yoo |
| 2009/0292984 A1* | 11/2009 | Bauchot ................. H04L 51/12 715/234 |
| 2010/0043072 A1 | 2/2010 | Rothwell |
| 2010/0118972 A1 | 5/2010 | Zhang et al. |
| 2011/0225652 A1* | 9/2011 | Emigh .................... H04L 67/18 726/22 |
| 2012/0042365 A1* | 2/2012 | Shoval ................. G06F 21/567 726/7 |
| 2012/0109741 A1 | 5/2012 | Ballapragada et al. |
| 2012/0174218 A1 | 7/2012 | McCoy et al. |

\* cited by examiner

PROCESS
600

A FIRST SET OF DATA IS RECEIVED AT A FIRST EMBEDDED COMPUTER
602

GRAPHICAL DATA RELATED TO THE FIRST SET OF DATA IS DISPLAYED ON A FIRST DISPLAY
604

THE GRAPHICAL DATA IS CAPTURED AS A SECOND SET OF DATA VIA AN IMAGE CAPTURING DEVICE
606

THE SECOND SET OF DATA IS CORRELATED WITH A COMMUNICATION PROTOCOL AT A SECOND EMBEDDED COMPUTER TO GENERATE CORRELATED INFORMATION
608

THE SECOND SET OF DATA AND THE CORRELATED INFORMATION ARE PREPARED FOR RECEIPT BY A USER COMPUTER SYSTEM
610

A THIRD SET OF DATA IS RECEIVED FROM SAID USER COMPUTER SYSTEM BASED ON MOUSE CLICK LOCATIONS ASSOCIATED WITH AN IMAGE WHEREIN SAID IMAGE IS BASED ON SAID SECOND SET OF DATA AND SAID CORRELATED INFORMATION
612

FIG. 6

PROCESS
700

THE FIRST SET OF DATA IN THE SECOND DOMAIN FORMAT IS DISPLAYED VIA AN OPTICAL INTERFACE SUCH THAT THE FIRST SET OF DATA IN THE SECOND DOMAIN FORMAT IS MISALIGNED WITH AN IMAGE CAPTURING DEVICE
702

THE CAPTURED FIRST SET OF DATA IN THE SECOND DOMAIN FORMAT USING THE IMAGE CAPTURING DEVICE OPERATES SUCH THAT THE FIRST SET OF DATA IN THE SECOND DOMAIN FORMAT IS CAPTURED MISALIGNED FROM FIRST SET OF DATA IN THE SECOND DOMAIN FORMAT DISPLAYED VIA THE OPTICAL INTERFACE
704

A DEGREE OF MISALIGNMENT BETWEEN THE OPTICAL INTERFACE AND THE IMAGE CAPTURING DEVICE IS PERIODICALLY CHANGED
706

FIG. 7

GRAPHICAL RENDERING OF MALICIOUS WEB PAGES

RELATED U.S. APPLICATION

This application claims priority to and is a Continuation of the co-pending patent application Ser. No. 15/295,585, entitled "CODE DOMAIN ISOLATION," with filing date Oct. 17, 2016, by Phillip J. Sobolewski and Mark Doyle, and assigned to the assignee of the present invention, which is incorporated herein, in its entirety, by reference.

The with Ser. No. 15/295,585 claims priority to and is a Continuation-in-Part of the patent application Ser. No. 14/498,404, entitled "CODE DOMAIN ISOLATION," with filing date Sep. 26, 2014, now U.S. Issued U.S. Pat. No. 9,485,227, by Phillip J. Sobolewski and Mark Doyle, and assigned to the assignee of the present invention, which is incorporated herein, in its entirety, by reference.

The application with Ser. No. 14/498,404 claims priority to and is a continuation of the patent application Ser. No. 13/197,651, now U.S. Issued U.S. Pat. No. 8,875,273, entitled "CODE DOMAIN ISOLATION," with filing date Aug. 3, 2011, by Phillip J. Sobolewski and Mark Doyle, and assigned to the assignee of the present invention, which is incorporated herein, in its entirety, by reference.

The application with Ser. No. 13/197,651 claims priority to the then co-pending U.S. Provisional Patent Application 61/459,748, entitled "METHOD FOR ISOLATING NETWORKS AND/OR SERVERS AND/OR HOST COMPUTERS FROM THE INTERNET AND/OR NETWORKS AND/OR OTHER SERVERS AND/OR HOST COMPUTERS AND/OR DEVICES USING GRAPHICS FOR THE PURPOSE OF VIRUS/MALWARE PROTECTION. THE "GRAPHICAL ISOLATION" IS PROVIDED VIA OPTICAL AND/OR ELECTRONIC AND/OR ELECTROMAGNETIC MEDIUM.," with filing date Dec. 17, 2010. The application with Ser. No. 13/197,651 incorporated the Provisional Patent Application 61/459,748 in its entirety by reference.

FIELD

Embodiments of the present invention relate generally to achieving code domain isolation.

BACKGROUND

The Internet has become the major source of information in almost all aspects of modern life. As a result, most users of the Internet spend a portion of their online session time following hyperlinks from one web page to another in search of information. This practice is commonly known as "web surfing" and is a major activity that contributes to virus and malware infections of devices connected to the Internet. In some instances, web surfing is practiced by businesses in order to conduct their daily business.

BRIEF DESCRIPTION OF THE DRAWINGS

FIG. 6 illustrates a flowchart of an example method for achieving code domain isolation in accordance with embodiments of the present technology.

FIG. 7 illustrates a flowchart of an example method for achieving code domain isolation in accordance with embodiments of the present technology.

Figure 1:
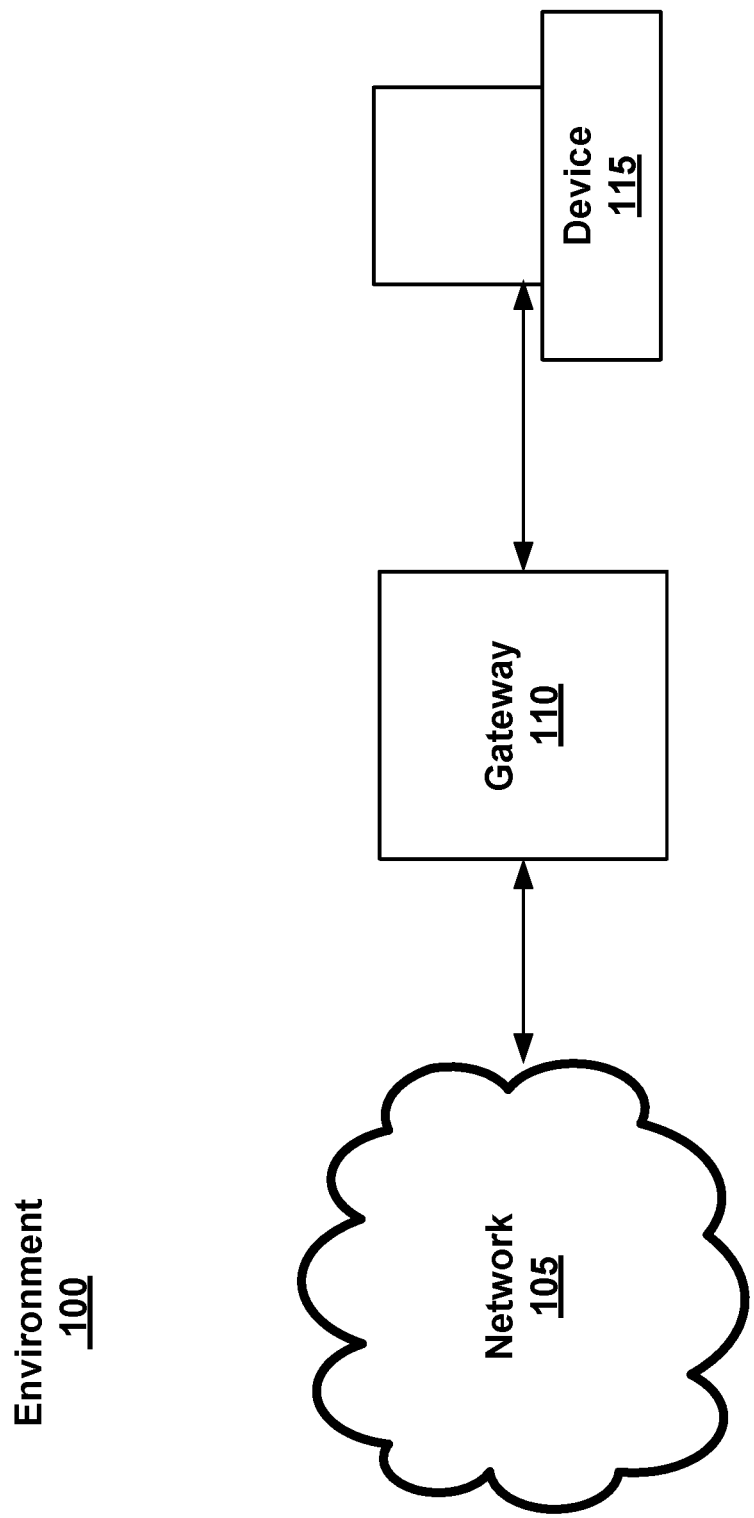
FIG. 1 illustrates a block diagram of an example environment for achieving code domain isolation in accordance with embodiments of the present technology.

The drawings referred to in this description of embodiments should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Unless specifically stated otherwise as apparent from the following discussions, it is appreciated that throughout the present description of embodiments, discussions utilizing terms such as "receiving," "changing," "code" "capturing," "preparing," "correlating," "displaying," or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices, including integrated circuits down to and including chip level firmware, assembler, and hardware based micro code.

Overview of Achieving Code Domain Isolation

As a user employs a device to perform web surfing, the device becomes susceptible to virus and malware infiltrations. Various solutions exist to provide protection against such threat. One technique is to recognize and isolate, remove or block malicious code from infecting the device. Thus, virus protection software packages are very complex and must be updated on a frequent basis to keep up with the latest form of virus threat. As a result they are costly and require continued maintenance while remaining less than completely effective against the vast array of web based viruses and malware. Networks may use firewalls configured with virus software packages and complex rule sets that must be constantly updated to stay effective against the latest Internet based viruses and malware. The terms virus and malware as described herein refer to all forms of cyber-attacks against a computer.

In other words, for this technique of virus protection to work, the virus protection must be made aware of every potential virus and malware. Thus such virus protection techniques are only as good as their latest updates. However, there is always a threat that such virus protection and firewalls will not catch a particular virus or malware that may infect a computer by simply clicking a hyperlink to a web site.

Additionally, many forms of malware are accepted by virus protection software packages so that the user experience can be improved and ecommerce may be made more profitable. However, this view of malware is at the expense of the consumer in many cases. Malware as it exists on web sites is used for various reasons such as increasing and improving the user experience as well as tracking customer habits, likes, dislikes, political views, and sexual preferences. Such malware may be downloaded to a user device as "cookie" or other data when a website is visited by clicking on a hyperlink. In many cases federal privacy laws are being broken. Users may continue to use the web for gathering information and in most cases do so while knowing their web surfing habits are being tracked and recorded.

The present technology offers a solution that protects a device against virus and malware threats and does not require a prior knowledge of any potential virus or malware to provide successful protection. In various embodiments, the present technology employs methods and devices that use graphics or a visual representation of the data from web sites that allows the user to surf the Internet while remaining virus and malware free. These methods and devices put the user back in control of their web surfing experience by allowing them to choose how they want to interact with Web sites that they visit. This restores their privacy and protects their valuable hardware and software investment.

In one embodiment, the present technology operates to isolate a user device from the Internet for the purpose of virus and malware protection while web surfing. The user device may be a computer system or other computing device with networking capabilities. In one embodiment, the present technology uses CDI Code Domain Isolation (CDI) gateway. The CDI gateway may be a hardware device that is placed between an unsecure Internet connection and the user device. In one embodiment, the CDI gateway receives information related to a web site in a digital format. The CDI gateway then changes the information to an analog format and then back to a digital format. This digital-analog-digital change ensures that only data the user desires is received at the user device while malware and viruses are not received at the user device.

In one embodiment, the CDI gateway employs two computer systems, an unprotected embedded computer and a protected embedded computer. The unprotected embedded computer may navigate to a website and display the website on a display inside of the CDI gateway. The protected embedded computer may be associated with an image capturing device that captures an image of the display associated with the unprotected embedded computer. The captured image may then be converted to a digital format and correlated with a communication protocol to be received by the user device. For example, the captured image may be overlaid with a hypertext markup language (HTML) image map and then wrapped in a frame for compatibility with a browser. The user device may then display the image in a browser. The HTML image map wrapped in a frame allows the user to interact with the image in a manner that is substantially the same as though the user were interacting with the web site without the CDI gateway. Importantly, in various embodiments of the present invention, no correlation occurs. In such embodiments, the first set of data is placed in the third domain format, for receipt by a user computer system, without requiring the use of correlated information.

The user device may send commands and information back to the protected embedded computer of the CDI gateway. In one embodiment, the protected embedded computer passes the commands and information to the unprotected embedded computer without changing or converting the commands and information. In one embodiment, the protected embedded computer receives the commands and information in a digital format and converts the commands and information to an analog format. The unprotected embedded computer may receive the commands and information in the analog format which it then changes back to a digital format and then interacts with the Internet based on the commands and information.

Thus the present technology allows a user to perform web surfing while completely blocking all viruses and malware from the user device by converting information related to the web surfing from digital to analog to digital. Such a technique may be referred to as code domain isolation or analog graphical isolation.

The following discussion will demonstrate various hardware, software, and firmware components that are used with and in devices and computer systems and integrated circuits used for achieving code domain isolation in various embodiments of the present technology. Furthermore, the devices, computer systems and their methods may include some, all, or none of the hardware, software, and firmware components discussed below.

Embodiments of Achieving Code Domain Isolation

With reference now to FIG. 1, a block diagram of an example environment for achieving code domain isolation shown in accordance with embodiments of the present technology. Environment 100 includes network 105, gateway 110, and device 115. Environment 100 comprises components that may or may not be used with different embodiments of the present technology and should not be construed to limit the present technology.

FIG. 1 depicts network 105 which is a network of computing devices that communicate with each other over a protocol. It should be appreciated that network 105 may be the Internet or some other network. In one embodiment, network 105 is an unsecure network that provides information to device 115 that may include viruses or malware.

It should be appreciated that gateway 110 is a hardware device that may comprise various hardware components and may employ software and firmware in operation. In one embodiment, gateway 110 has communication ports that allow a connection to a network such as network 105 and a device such as device 115. FIG. 1 depicts gateway 110 as being an independent hardware device. In one embodiment, gateway 110 is not a single device, but is distributed over two or more devices. In one embodiment, gateway 110 is considered part of device 115. In one embodiment, gateway 110 may comprise a modem for an Internet connection, a router, a wireless router and/or an integrated circuit chip. It should be appreciated that gateway 110 may be connected to more than one user devices and more than one network. Gateway 110 may also employ other components common to computing devices such as, processors, random access memory, storage mediums, power sources, etc. In one embodiment, gateway 110 is a CDI gateway and has the same capabilities as those described for a CDI gateway.

In one embodiment, gateway 110 is employed by a corporation or other enterprise and is physically placed between a gateway router and a local area network to provide isolation from the public Internet. In one embodiment, gateway 110 is place between a residential router and a personal computer. In either of these scenarios, gateway 110 allows device 115 to employ cloud computing performed in network 105.

FIG. 1 depicts device 115 which is a computing device. It should be appreciated that device 115 may be a computer system, a desktop computer, a laptop or notebook, a netbook, a handheld device, a tablet, or any other computing device with network capabilities. In one embodiment, device 115 is able to operate browser software commonly associated with web surfing. Device 115 may connect and communicate with gateway 110 using a wired or wireless connection as well as many standard well known protocols. For example, gateway 110 and device 115 may employ an Ethernet cable. In one embodiment, device 115 employs browser software that is well known in the art for web surfing and accesses websites on the Internet by first accessing gateway 110 which acts as an intermediary for all data passed between network 105 and device 115.

Figure 2:
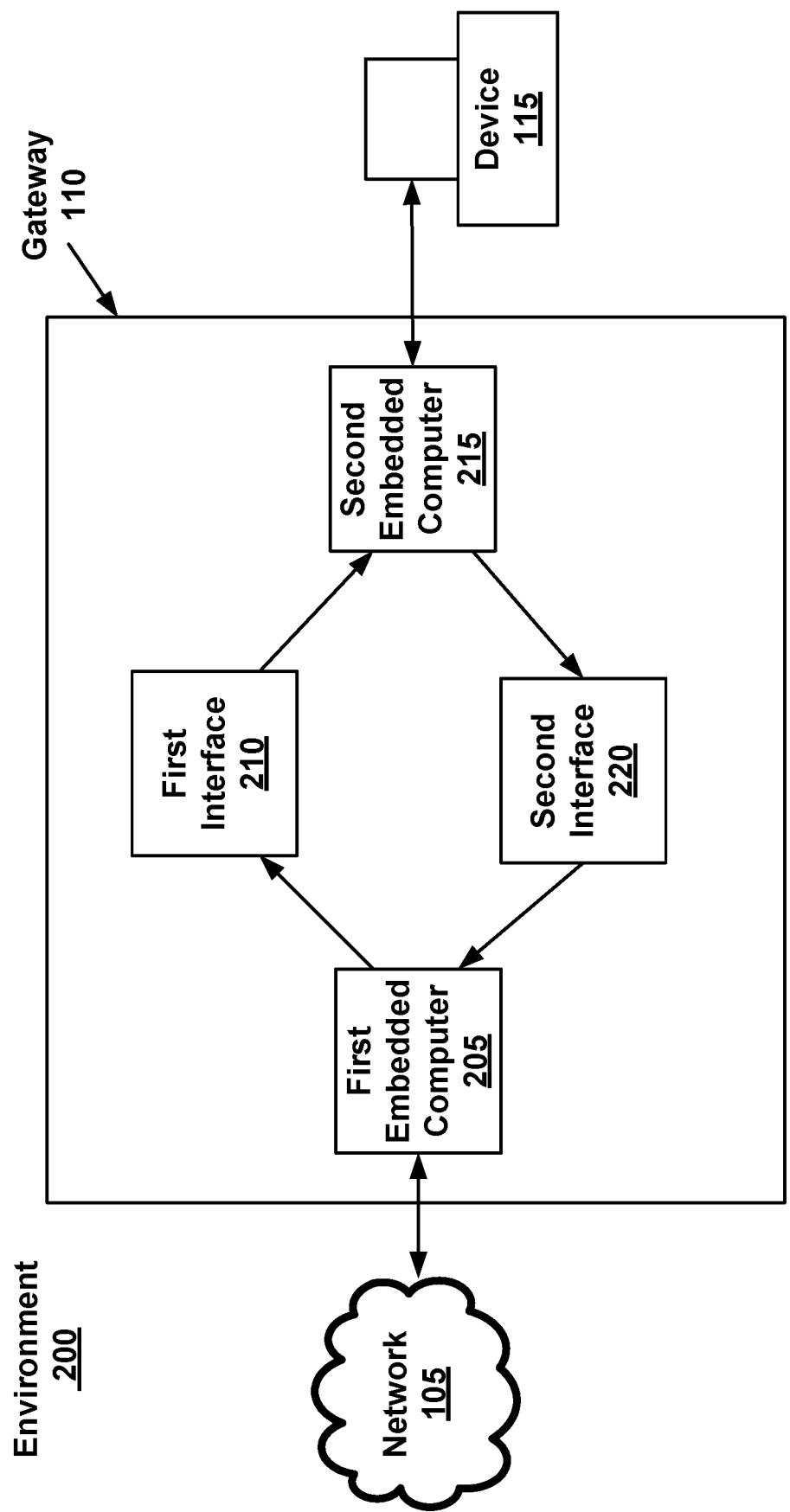
FIG. 2 illustrates a block diagram of an example environment for achieving code domain isolation in accordance with embodiments of the present technology.

With reference now to FIG. 2, a block diagram of an example environment for achieving code domain isolation shown in accordance with embodiments of the present technology. Environment 200 includes network 105, gateway 110, device 115, first embedded computer 205, first interface 210, second embedded computer 215, and second interface 220. Environment 200 comprises components that may or may not be used with different embodiments of the present technology and should not be construed to limit the present technology. In the present application, in various embodiments, first and second embedded computers 205 and 215 are comprised of processors. In other embodiments, first and second embedded computers 205 and 215 are comprised of processors and additional hardware and software. As will be further described below, in one embodiment of the present invention, the first embedded computer is a virtual machine. In one such embodiment, the first and second embedded computers reside on the same physical machine. That is, in one such embodiment, the virtualized first embedded computer is hosted by, and resides on, the same physical machine on which the second embedded computer physically resides.

In another embodiment of the present invention, wherein the first embedded computer is a virtual machine, the first and second embedded computers do not reside on the same physical machine. That is, in one such embodiment, the virtualized first embedded computer is hosted by, and resides on, a physical machine which is different from the physical machine on which the second embedded computer physically resides.

In another embodiment of the present invention, the second embedded computer is a virtual machine. In one such embodiment, the first and second embedded computers reside on the same physical machine. That is, in one such embodiment, the virtualized second embedded computer is hosted by, and resides on, the same physical machine on which the first embedded computer physically resides.

In another embodiment of the present invention, wherein the second embedded computer is a virtual machine, the first and second embedded computers do not reside on the same physical machine. That is, in one such embodiment, the virtualized second embedded computer is hosted by, and resides on, a physical machine which is different from the physical machine on which the first embedded computer physically resides.

In other embodiments, both the first and second embedded computers are virtual machines. In one such embodiment, the first and second virtualized embedded computers reside on the same physical machine. That is, in one such embodiment, both the virtualized first embedded computer and the virtualized second embedded computer are hosted by, and reside on, the same physical machine.

In another embodiment, in which both the first and second embedded computers are virtual machines, the first and second virtualized embedded computers do not reside on the same physical machine. That is, in one such embodiment, the virtualized first embedded computer and the virtualized second embedded computer are hosted by, and reside on, separate physical machines. That is, in one such embodiment, the virtualized second embedded computer is hosted by, and resides on, a physical machine which is different from the physical machine on which the virtualized first embedded computer resides and is hosted.

It should be appreciated that network 105, gateway 110, and device 115 of FIG. 2 have all the same capabilities as those described for network 105, gateway 110, and device 115 of FIG. 1.

In one embodiment, first embedded computer 205 and second embedded computer 215 of gateway 110 are computer systems that each employ a processor for manipulating electronic digital data. First embedded computer 205 may be an unprotected embedded computer connected with network 105 and may have the ability to perform web surfing, but is not directly connected with device 115. In one embodiment, second embedded computer 215 is a protected embedded computer that does not directly connect with network 105, but does directly connect with device 115. In one embodiment, first embedded computer 205 only sends communication to second embedded computer 215 through interface 210 and second embedded computer 215 only send communication to first embedded computer 205 through second interface 220. In one embodiment of the present invention, the first and second embedded computers are co-located on the same physical machine. That is, in one such embodiment, the first and second embedded computers physically reside within the same physical machine.

In another embodiment of the present invention, the first and second embedded computers are separately located from each other. That is, in one such embodiment, the first embedded computer resides on a physical machine which is different from the physical machine on which the second embedded computer physically resides.

In another embodiment of the present invention, the first embedded computer is a virtual machine. In one such embodiment, the first and second embedded computers reside on the same physical machine. That is, in one such embodiment, the virtualized first embedded computer is hosted by, and resides on, the same physical machine on which the second embedded computer physically resides.

In another embodiment of the present invention, wherein the first embedded computer is a virtual machine, the first and second embedded computers do not reside on the same physical machine. That is, in one such embodiment, the virtualized first embedded computer is hosted by, and resides on, a physical machine which is different from the physical machine on which the second embedded computer physically resides.

In another embodiment of the present invention, the second embedded computer is a virtual machine. In one such embodiment, the first and second embedded computers reside on the same physical machine. That is, in one such embodiment, the virtualized second embedded computer is hosted by, and resides on, the same physical machine on which the first embedded computer physically resides.

In another embodiment of the present invention, wherein the second embedded computer is a virtual machine, the first and second embedded computers do not reside on the same physical machine. That is, in one such embodiment, the virtualized second embedded computer is hosted by, and resides on, a physical machine which is different from the physical machine on which the first embedded computer physically resides.

In one embodiment, first embedded computer 205 employs firmware to carry out operations. First embedded computer 205 may have a storage medium to store such firmware and the storage medium is flashable such that new firmware or updates may be implemented. In one embodiment, the firmware on first embedded computer 205 is reset and memory associated with first embedded computer 205 is flushed to eliminate any digital code received by first embedded computer 205 over network 105. Such a reset could be performed automatically on a periodic basis or after each hyperlink download. Such a reset would cause first embedded computer 205 to reload a browser used for web surfing. Thus the reset would prevent attempts to install viruses or malware on first embedded computer 205.

In one embodiment, first embedded computer 205 is configured to receive a first set of data in a first domain format and change it to a second domain format which is sent to second embedded computer 215 over first interface 210. Second embedded computer 215 then captures the first set of data in the second domain format and changes the first set of data to a third domain format. The first set of data may then be sent or transmitted to device 115. In one embodiment, the first and third domain formats are digital and the second domain format is analog. In one embodiment, gateway 110 uses a digital-to-analog-to-digital process to remove all digital based computer code artifacts from the web page before sending it to the browser of the protected computer.

Importantly, for purposes of the present application, the term "first domain format" refers to code/data in the pre-execution state. That is, the code/data as it is initially received from a source and prior to execution of the processes of the present invention.

For purposes of the present application, the term "second domain format", refers to code/data in the post-execution state, and wherein the code/data includes all information/intelligence/output created as a result of the execution of at least some of the processes of the present invention. This post-execution information/intelligence/output can take any form to include, but is not limited to, code/data, visual, audible, mechanical, kinetic, non-kinetic, static or dynamic system state and/or machinery state information.

For purposes of the present application, the term "third domain format", refers to information/intelligence/output of second domain format post-execution code/data formatted for use by a particular computer system or user device. It should further be understood that the computer system and/or user device may have any form/format necessary to accomplish a desired goal with the code/data in the third domain format.

For purposes of the present application, the term "changing said first set of data to a second domain format", refers to the process of executing data/code in the first domain format (pre-execution state) to change it to the second domain format (post-execution state to include all information/intelligence/output created as a result of execution). Additionally, for purposes of the present application, the term "capturing said first set of data in said second domain format", refers to the extraction of all information/intelligence/output created as a result of execution of first domain format code/data by any means necessary to include, but not limited to, the transfer of code/data, visual, audible, mechanical, kinetic, non-kinetic, static or dynamic system state and/or machinery state information/intelligence/output.

As a further point of clarification, in the present application, the code/data can take the form of, but is not limited to, standard browser rendering objects, such as the "rendering tree" or the Document Object Model (DOM) of post-execution browser code which the particular computer system or user device can use to locally generate pixels on a display screen using the paint process of the local browser. Also, in the present application, the term "changing said first set of data in said second domain format to a third domain format", refers to formatting the extracted information/intelligence/output of the second domain format (which can take the form of, but not limited to, code/data, visual, audible, mechanical, kinetic, non-kinetic, static or dynamic system state and/or machinery state information) for use by a particular computer system or user device (having any form/format to accomplish a desired goal).

In the present application, the term "code domain" refers to a location where any type of computer/CPU/processor code/data is executed. This location includes, but is not limited to, for example, a processor-accessible memory space of any form or format. This location further includes, but is not limited to, for example, static or dynamic random access memory (RAM), hardware-based code/data execution environments or virtualized code/data execution environments such as highly dynamic and temporary virtual machines or cloud computing environments, or client devices and/or applications, or within executing applications or programs. These code/data execution environments exist, for example, in any form of code/data carrying media capable of storing and/or executing computer code/data.

Additionally, for purposes of the present application, the term "code domain isolation", refers to isolation between two or more code domains as defined above. In the present application, two or more code domains are deemed to be isolated when code/data executing in a specific code domain cannot affect, or have an effect, on another code domain. This includes code/data that exists in a code domain in a pre-execution state, executing state (while executing), and a post-execution state.

In one embodiment, second embedded computer 215 correlates the first set of data in the third domain format with a communication protocol to generate correlated information. For example, correlated information may comprise an image overlaid with a hypertext markup language (HTML) image map and wrapped in a frame for compatibility with a browser at device 115. In one embodiment, the HTML frames are linked or embedded as HTML streaming media, with an HTML map overlay, to allow viewing via the browser running on device 115.

Although second embedded computer 215 correlates the first set of data in the third domain format with a communication protocol to generate correlated information in the present embodiment, in various embodiments of the present invention, the first set of data in the third domain format is not correlated with a communication protocol. In such "non-correlated" embodiments, the first set of data is placed in the third domain format, for use by a user computer system, without requiring the use of correlated information as described above.

Referring again to a "correlated" embodiment, the user can now view the processed web page frames in real time as a streaming media feed and follow hyperlinks by clicking anywhere in the streaming media frame. In one embodiment, the user's mouse click location in the browser on device 115 will be detected by the layered HTML map and sent back to a browser running on first embedded computer 205 for execution. This process may be described as graphic based browsing of web sites.

It should be appreciated that first interface 210 may include various embodiments for sending data from first embedded computer 205 to second embedded computer 215. In one embodiment, first interface 210 comprises dual port memory where first embedded computer 205 places the web page display into video memory that is accessible by the second embedded computer 215 where it is converted to a graphical image with correlated information and transmitted or sent to device 115. The use of interfaces digitally isolates first embedded computer 205 and second embedded computer 215 from one another.

In one embodiment, first interface 210 employs a copper monitor interface such as a video graphics array connector (VGA), a super VGA connector, etc. In one embodiment, first interface 210 employs optical drivers and receivers for electronic isolation of the digital code. In one embodiment, first interface 210 employs an optical interface or display, an image receiving device and an air gap. It should be appreciated that second interface 220 is able to employ interfaces similar to first interface 210.

First interface 210 and second interface 220 are not required to be the same as one another, but may employ different techniques and hardware from one another. In one embodiment, gateway 110 employs first interface 210 but does not employ a second interface 220. For example, the user of device 115 may receive data at device 115, but then directly inputs commands and data into first embedded computer 205 using input devices such as a keyboard and mouse. In one embodiment, second interface 220 does not convert or change digital commands and data from second embedded computer 215 but simply passes the digital commands and data directly to first embedded computer 205.

In one embodiment, first embedded computer 205 runs browser software that is remotely controlled by second embedded computer 215 through a unidirectional command stream received via second interface 220. In one embodiment, the remote control of the browser on first embedded computer 205 is accomplished across the analog data path inside gateway 110 thus providing complete isolation between first embedded computer 205 and second embedded computer 215. This isolation prevents any code based viruses and malware from passing from first embedded computer 205 to second embedded computer 215.

The browser commands are graphically or visually embedded in a picture frame at second embedded computer 215 so that they can pass through an analog based air gap to first embedded computer 205 preserving isolation between first embedded computer 205 and second embedded computer 215.

In one embodiment, second embedded computer 215 converts the commands from device 115 and embeds them in an image by color encoding, as a series of picture frame edge pixels to form a binary code representing a browser command, or a combination of color encoding and a series of picture frame edge pixels. The binary code is translated into a browser command via a simple lookup table. The color encoding or a series of picture frame edge pixels can be displayed by a display associated with second embedded computer 215 and then captured by an image capturing device associated with first embedded computer 205.

Figure 3:
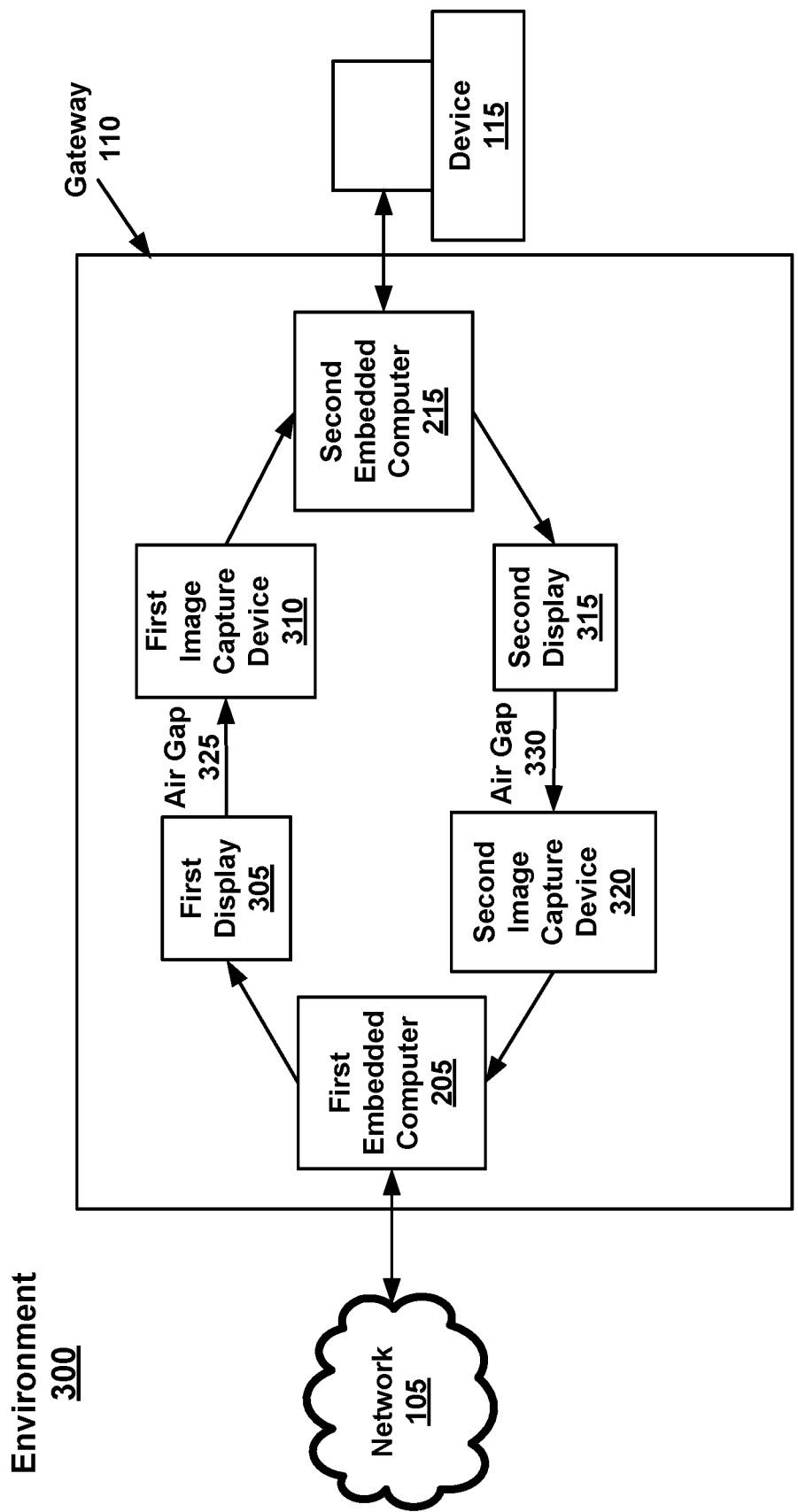
FIG. 3 illustrates a block diagram of an example environment for achieving code domain isolation in accordance with embodiments of the present technology.

With reference now to FIG. 3, a block diagram of an example environment for achieving code domain isolation shown in accordance with embodiments of the present technology. Environment 300 includes network 105, gateway 110, device 115, first embedded computer 205, second embedded computer 215, first display 305, air gap 325, first image capture device 310, second image capture device 320, air gap 330, and second display 315. Environment 300 comprises components that may or may not be used with different embodiments of the present technology and should not be construed to limit the present technology.

It should be appreciated that network 105, gateway 110, and device 115 of FIG. 3 have all the same capabilities as those described for network 105, gateway 110, and device 115 of FIG. 1.

First display 305 may be a standard display associated with computers such as liquid crystal display (LCD). In one embodiment, first display 305 is a high resolution miniature display housed inside gateway 110 and may not be seen unless an outer housing of gateway 110 is opened. First display 305 is associated with first embedded computer 205 and is not directly connected to second embedded computer 215. First display 305 may be separated from first image capture device 310 by air gap 325 which is a distance between first display 305 and first image capture device 310 that is filled with air. Air gap 325 ensures that no digital code is passed from first embedded computer 205 to second embedded computer 215. First image capture device 310 is associated with second embedded computer 215 and is an image capturing device such as a camera, a digital camera, a video camera, an array of optical sensors, a charge couple device (CCD), etc.

First embedded computer 205 converts a digital code by receiving the digital code as data associated with a computing device on network 105 such as a web site. First embedded computer 205 then converts the digital code to an analog format by displaying an image or graphic on first display 305. This analog image is then captured by first image capture device 310 as an analog image which is then converted to digital code by second embedded computer 215. This procedure may be repeated regularly. Thus first display 305 may display a series of images and first image capture device 310 may capture a series of images. In turn, second embedded computer 215 then sends a series of images to device 115 in a stream of data.

Second display 315 is associated with second embedded computer 215 and is not directly connected with first embedded computer 205. Second image capture device 320 is associated with first embedded computer 205 and is not directly connected with second embedded computer 215. Second display 315 and second image capture device 320 are separated by air gap 330. It should be appreciated that that gateway 110 may employ first display 305 and first image capture device 310 while not employing second image capture device 320 and second display 315. First display 305 and first image capture device 310 have capabilities and perform similar to second image capture device 320 and second display 315. Thus first embedded computer 205 and second embedded computer 215 can communicate with one another in a purely analog format. This ensures that viruses and malware are not passed from first embedded computer 205 to second embedded computer 215 and onto device 115 or visa versa.

The present technology may employ techniques to encrypt the analog data captured by first image capture device 310 or second image capture device 320. One technique may be referred to as purposeful optical misalignment (POM).

In one embodiment, purposeful optical misalignment is implemented by introducing misalignment within the miniaturized high-resolution camera-display pairs. This misalignment provides a raster effect and prevents any virus that may be embedded in a graphic file from traversing the optical air gap by distorting the one-to-one, or pixel-to-pixel correspondence that could exist between a perfectly aligned camera-display pair. Such a misalignment can be randomly created by manufacturing gateway 110 under conditions that allow variance in the placement of first display 305 and first image capture device 310. In one embodiment, the misalignment may be based on preselected values and is not random.

In one embodiment, gateway 110 can be manufactured such that the degree of misalignment between first display 305 and first image capture device 310 changes during operation. For example, first display 305, first image capture device 310 or both may be mechanically moved relative to one another. The movement or adjustments may be made in real-time or at periodic intervals. The movements may be random or preselected. Such movements may change the distance associated with air gap 325. Second display 315 and second image capture device 320 may similarly be misaligned.

Another technique for analog encryption may be referred to as pixel scaling. Pixel scaling is implemented by ensuring that the number of pixels contained in the miniature display and in the video frame of the miniature camera are not the same. In one embodiment, first display 305 may be fixed with a resolution that is intentionally different than the resolution employed by first image capture device 310 for capturing images. In one embodiment, the resolutions used by first display 305 and first image capture device 310 are electronically changed. The changes in resolution may be made at regular or random intervals and may change to resolution to randomly selected values or preselected values.

In one embodiment, pixel scaling is also performed by adjusting the distance associated with air gap 325 or air gap 330 in a real time random fashion or at intervals. This adjustment could be interleaved between random numbers of video frames by using a blanking circuit controlled by a random number source. These scaling and misalignment processes may be accomplished with high-resolution optical equipment and therefore will not noticeably affect the output of the device as all web pages are at much lower resolutions.

In one embodiment, gateway 110 may operate to filter or convert some web pages and not others. For example, a list of safe web sites may be established. Such a safe list may comprise web sites that are known to a user to not contain viruses or malware. Or a user may simply desire a website not to be converted or filtered by gateway 110. An example of a safe web site may be a web site hosted by a bank and employed by a user to accomplish financial transactions.

Operation

More generally, embodiments in accordance with the present invention are directed toward achieving code domain isolation. Such methods can be implemented at devices as described above that are configured to achieve code domain isolation.

Figure 5:
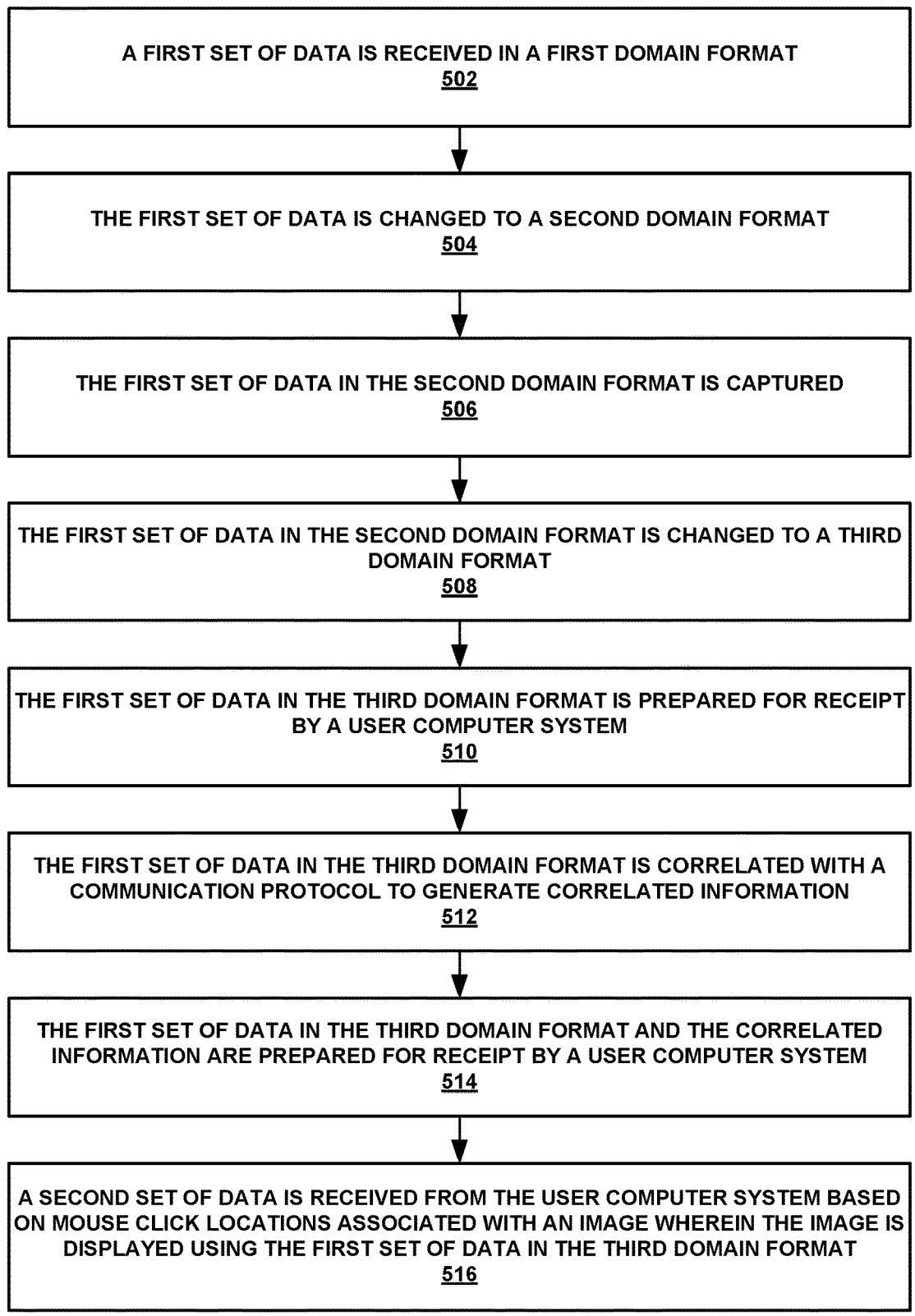
FIG. 5 illustrates a flowchart of an example method for achieving code domain isolation in accordance with embodiments of the present technology.

FIG. 5 is a flowchart illustrating process 500 for achieving code domain isolation, in accordance with one embodiment of the present invention. In one embodiment, process 500 is carried out, at least in part, by processors and electrical components under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 500 is performed by devices and components in FIGS. 1-3.

In one embodiment, process 500 is used to achieve code domain isolation. It should be appreciated that the steps of process 500 may not need to be executed in the order they are listed in. Additionally, embodiments of the present technology do not require that all of the steps of process 500 be executed to achieve code domain isolation. At 502, in one embodiment, a first set of data is received in a first domain format. In one embodiment, the first set of data in the first domain format is in a protocol associated with data exchanged on the Internet.

At 504, the first set of data is changed to a second domain format. In one embodiment, the first set of data is changed to an analog format (i.e. the second domain format) by displaying the data as a graphic or image on an optical interface such as a display. In one embodiment, changing the data to the second domain format removes digital code from first set of data.

The changing of the first set of data to a third domain format converts the first set of data into a graphical image. In one embodiment, the changing of the first set of data to a second domain format occurs via an analog monitor interface that is composed of a copper material. In one embodiment, the changing of the first set of data to a second domain format occurs via an optical driver and the capturing the first set of data in the second domain format occurs via an optical receiver.

At 506, the first set of data in the second domain format is captured. In one embodiment, the data is captured using an image capturing device.

At 508, the first set of data in the second domain format is changed to a third domain format. In one embodiment, the first domain format and the third domain format are digital and the second domain format is analog.

At 510, the first set of data in the third domain format is prepared for receipt by a user computer system.

At 512, the first set of data in the third domain format is correlated with a communication protocol to generate correlated information.

At 514, the first set of data in the third domain format and the correlated information are prepared for receipt by a user computer system. In one embodiment, the first set of data in the third domain format and the correlated information comprise an image overlaid with a hypertext markup language image map and wrapped in a frame for compatibility with a browser at the user computer system.

At 516, a second set of data is received from the user computer system based on mouse click locations associated with an image wherein the image is displayed using the first set of data in the third domain format.

FIG. 6 is a flowchart illustrating process 600 for achieving code domain isolation, in accordance with one embodiment of the present invention. In one embodiment, process 600 is carried out, at least in part, by processors and electrical components under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 600 is performed by devices and components in FIGS. 1-3.

In one embodiment, process 600 is used to achieve code domain isolation. It should be appreciated that the steps of process 600 may not need to be executed in the order they are listed in. Additionally, embodiments of the present technology do not require that all of the steps of process 600 be executed to achieve code domain isolation. At 602, in one embodiment, a first set of data is received at a first embedded computer.

At 604, graphical data related to the first set of data is displayed on a first display. For example, the first set of data may be displayed on first display 305 or second display 315 of FIG. 3.

At 606, the graphical data is captured as a second set of data via an image capturing device. The image capturing device may be first image capture device 310 or second image capture device 320 of FIG. 3.

At 608, the second set of data is correlated with a communication protocol at a second embedded computer to generate correlated information.

At 610, the second set of data and the correlated information are prepared for receipt by a user computer system. The user computer system may be device 115 of FIG. 1.

At 612, a third set of data is received from said user computer system based on mouse click locations associated with an image wherein said image is based on said second set of data and said correlated information. In one embodiment, the second set of data and the correlated information comprise an image overlaid with a hypertext markup language image map and wrapped in a frame for compatibility with a browser at the user computer system.

FIG. 7 is a flowchart illustrating process 700 for achieving code domain isolation, in accordance with one embodiment of the present invention. In one embodiment, process 700 is carried out, at least in part, by processors and electrical components under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 700 is performed by devices and components in FIGS. 1-3.

In one embodiment, process 700 is used to achieve code domain isolation. Process 700 may be carried out in conjunction with steps from either process 500 or process 600. It should be appreciated that the steps of process 700 may not need to be executed in the order they are listed in. Additionally, embodiments of the present technology do not require that all of the steps of process 700 be executed to achieve code domain isolation. At 702, in one embodiment, the first set of data in the second domain format is displayed via an optical interface such that the first set of data in the second domain format is misaligned with an image capturing device.

At 704, the captured first set of data in the second domain format using the image capturing device operates such that the first set of data in the second domain format is captured misaligned from first set of data in the second domain format displayed via the optical interface.

In one embodiment, the optical interface is misaligned with the image capturing device based on a difference in a number of pixel used by the optical interface and the image capturing device. In one embodiment, the optical interface is misaligned with the image capturing device based on a difference in a resolution used by the optical interface and the image capturing device.

At 706, a degree of misalignment between the optical interface and the image capturing device is periodically changed. In one embodiment, the periodically changing the degree of misalignment is achieved by changing a distance between the optical interface and the image capturing device.

Figure 8:
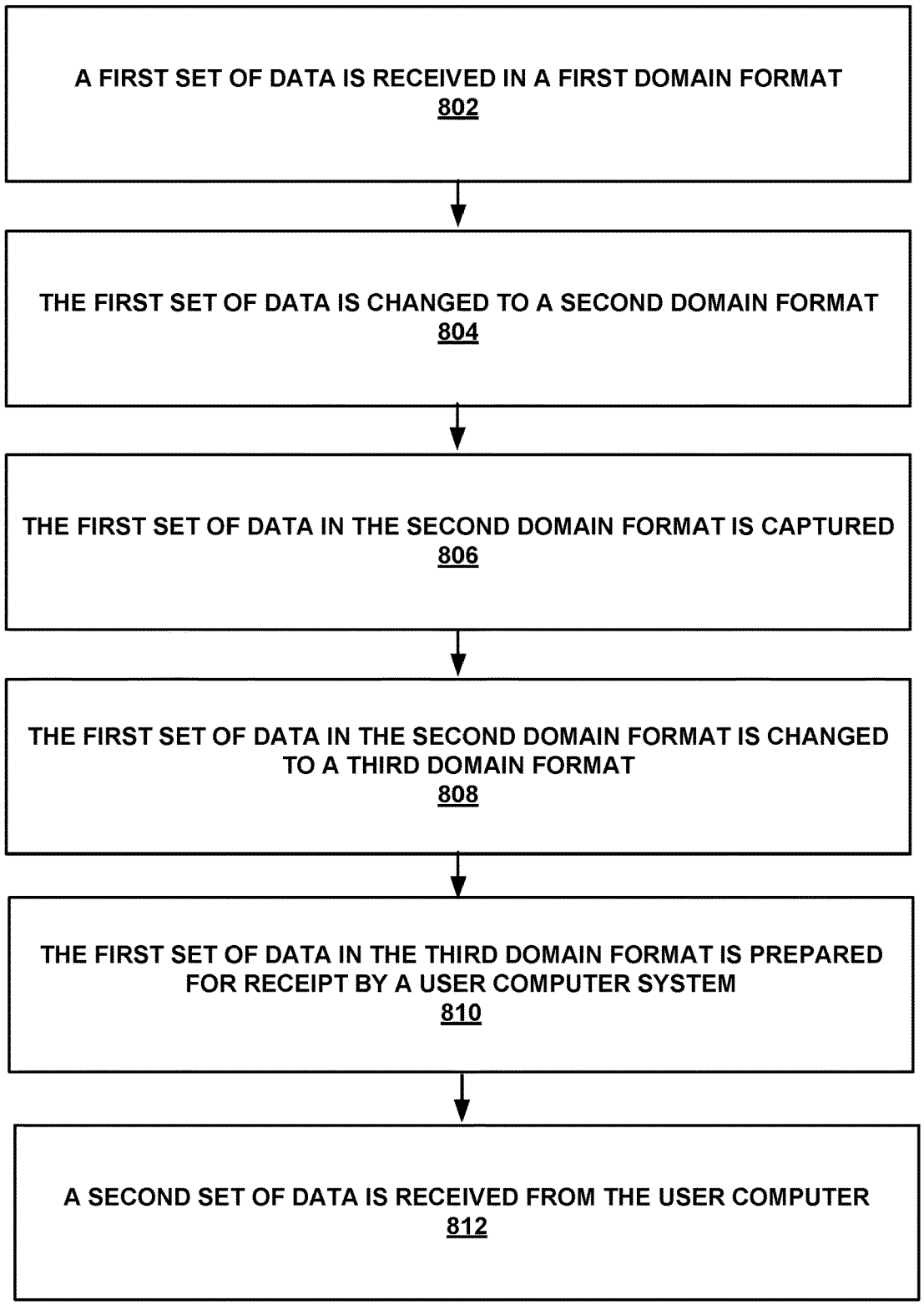
FIG. 8 illustrates a flowchart of an example method for achieving code domain isolation in accordance with embodiments of the present technology.

FIG. 8 is a flowchart illustrating process 800 for achieving code domain isolation, in accordance with one embodiment of the present invention. Importantly, in the embodiment described in process 800, code domain isolation is achieved without requiring the physical displaying of an image on a conventional graphic display device. Instead, as will be described in detail below, a rendered image (rather than being displayed on a display device) is stored in memory, for example, video memory. The stored rendered image is then subsequently accessed at the memory location at which it was stored. In such an embodiment, there is no need to access or capture an image from a display device.

In one embodiment of process 800, the changing of the first set of data to a second domain format occurs, in part, by placing the image of the first set of data into memory such as, for example, video memory. In such an embodiment, there is no requirement to graphically display the image of the first set of data in the first domain format on a conventional graphic display device.

In one embodiment, process 800 is carried out, at least in part, by processors and electrical components under the control of computer readable and computer executable instructions stored on a computer-usable storage medium. The computer readable and computer executable instructions reside, for example, in data storage features such as computer usable volatile and non-volatile memory and are non-transitory. However, the non-transitory computer readable and computer executable instructions may reside in any type of computer-usable storage medium. In one embodiment, process 800 is performed by devices and components in FIGS. 1-3.

In one embodiment, process 800 is used to achieve code domain isolation. It should be appreciated that the steps of process 800 may not need to be executed in the order they are listed in. Additionally, embodiments of the present technology do not require that all of the steps of process 800 be executed to achieve code domain isolation. At 802, in one embodiment, a first set of data is received in a first domain format. In one embodiment, the first set of data in the first domain format is in a protocol associated with data exchanged on the Internet.

At 804, graphical data related to the first set of data is generated. For example, image data corresponding to an image of the first set of data is generated. In so doing, the first set of data is changed to a second domain format. In one embodiment, the first set of data is changed to the second domain format by representing the first set of data as a graphic or image using an optical interface such as a camera to capture an image of the first set of data when received in the first domain format. In one embodiment, changing the data to the second domain format removes potentially malicious digital code from first set of data. The image data (corresponding to the first set of data in the second domain format) is then stored in memory such as, for example, video memory. In such an embodiment, there is no requirement to graphically display the image of the first set of data on a conventional graphic display device.

At 806, the first set of data in the second domain format is captured. In one embodiment, the data is captured by accessing the image data stored in the video memory.

At 808 and 810, the first set of data in the second domain format is changed to a third domain format, and the first set of data in the third format is prepared such that the first set of data is in the third domain format is in condition for receipt by a user computer system. In an embodiment in which no correlation occurs, the first set of data is placed in the third domain format and prepared without requiring the use of correlated information. In an embodiment in which correlation occurs, embodiments of the present invention correlate the first set of data in the third domain format with a communication protocol to generate correlated information. For example, correlated information may comprise an image overlaid with a hypertext markup language (HTML) image map and wrapped in a frame for compatibility with a browser at device 115. In one embodiment, the HTML frames are linked or embedded as HTML streaming media, with an HTML map overlay, to allow viewing via the browser running on device 115.

At 812, a second set of data is received from the user computer system based on user-selected locations associated with an image wherein the image is displayed using the first set of data in the third domain format.

Although the subject matter is described in a language specific to structural features and/or methodological acts, it is to be understood that the subject matter defined in the appended claims is not necessarily limited to the specific features or acts described above. Rather, the specific features and acts described above are disclosed as example forms of implementing the claims.

Example Computer System Environment

Figure 4:
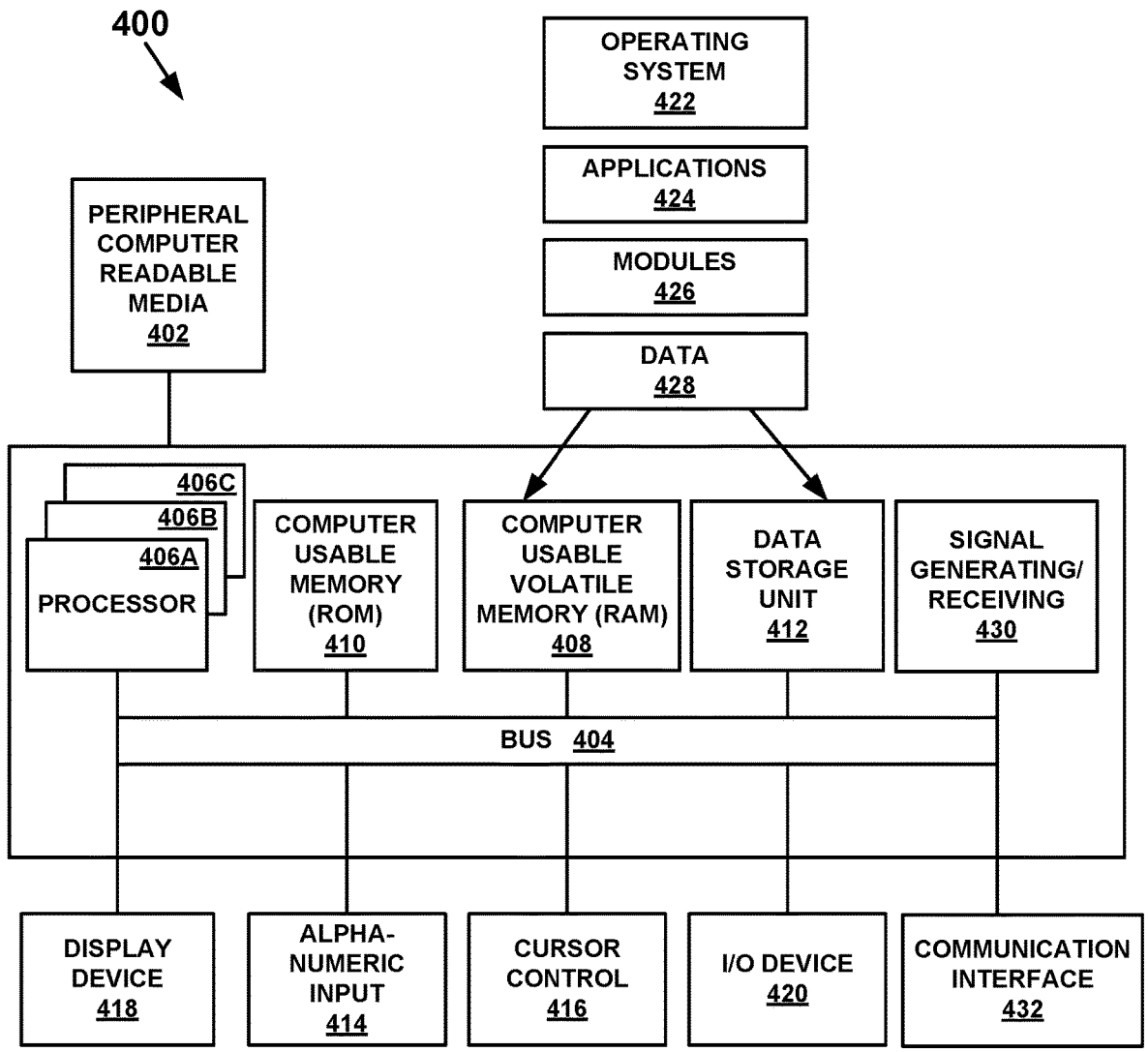
FIG. 4 illustrates a block diagram of an example computer system in accordance with embodiments of the present technology.

With reference now to FIG. 4, portions of the technology for providing a communication composed of computer-readable and computer-executable instructions that reside, for example, in computer-usable media of a computer system. That is, FIG. 4 illustrates one example of a type of computer that can be used to implement embodiments of the present technology. For example, computing devices on network 105 or device 115 may be an example of the computer system illustrated in FIG. 4 used in accordance with the present technology. Additionally, first embedded computer 205 or second embedded computer 215 may be depicted by the example computer system of FIG. 4. However, first embedded computer 205 and second embedded computer 215 may not comprise all the components depicted in FIG. 4 such as I/O device 420 and may share some components such as a power source.

FIG. 4 illustrates an example computer system 400 used in accordance with embodiments of the present technology. It is appreciated that system 400 of FIG. 4 is an example only and that the present technology can operate on or within a number of different computer systems including general purpose networked computer systems, embedded computer systems, routers, switches, server devices, user devices, various intermediate devices/artifacts, stand alone computer systems, mobile phones, personal data assistants, integrated circuit chips, televisions and the like. As shown in FIG. 4, computer system 400 of FIG. 4 is well adapted to having peripheral computer readable media 402 such as, for example, a floppy disk, a compact disc, and the like coupled thereto.

System 400 of FIG. 4 includes an address/data bus 404 for communicating information, and a processor 406A coupled to bus 404 for processing information and instructions. As depicted in FIG. 4, system 400 is also well suited to a multi-processor environment in which a plurality of processors 406A, 406B, and 406C are present. Conversely, system 400 is also well suited to having a single processor such as, for example, processor 406A. Processors 406A, 406B, and 406C may be any of various types of microprocessors. System 400 also includes data storage features such as a computer usable volatile memory 408, e.g. random access memory (RAM), coupled to bus 404 for storing information and instructions for processors 406A, 406B, and 406C.

System 400 also includes computer usable non-volatile memory 410, e.g. read only memory (ROM), coupled to bus 404 for storing static information and instructions for processors 406A, 406B, and 406C. Also present in system 400 is a data storage unit 412 (e.g., a magnetic or optical disk and disk drive) coupled to bus 404 for storing information and instructions. System 400 also includes an optional alphanumeric input device 414 including alphanumeric and function keys coupled to bus 404 for communicating information and command selections to processor 406A or processors 406A, 406B, and 406C. System 400 also includes an optional cursor control device 416 coupled to bus 404 for communicating user input information and command selections to processor 406A or processors 406A, 406B, and 406C. System 400 of the present embodiment also includes an optional display device 418 coupled to bus 404 for displaying information.

Referring still to FIG. 4, optional display device 418 of FIG. 4 may be a liquid crystal device, cathode ray tube, plasma display device or other display device suitable for creating graphic images and alpha-numeric characters recognizable to a user. Optional cursor control device 416 allows the computer user to dynamically signal the movement of a visible symbol (cursor) on a display screen of display device 418. Many implementations of cursor control device 416 are known in the art including a trackball, mouse, touch pad, joystick or special keys on alpha-numeric input device 414 capable of signaling movement of a given direction or manner of displacement. Alternatively, it will be appreciated that a cursor can be directed and/or activated via input from alpha-numeric input device 414 using special keys and key sequence commands.

System 400 is also well suited to having a cursor directed by other means such as, for example, voice commands. System 400 also includes an I/O device 420 for coupling system 400 with external entities. For example, in one embodiment, I/O device 420 is a modem for enabling wired or wireless communications between system 400 and an external network such as, but not limited to, the Internet. A more detailed discussion of the present technology is found below.

Referring still to FIG. 4, various other components are depicted for system 400. Specifically, when present, an operating system 422, applications 424, modules 426, and data 428 are shown as typically residing in one or some combination of computer usable volatile memory 408, e.g. random access memory (RAM), and data storage unit 412. However, it is appreciated that in some embodiments, operating system 422 may be stored in other locations such as on a network or on a flash drive; and that further, operating system 422 may be accessed from a remote location via, for example, a coupling to the internet. In one embodiment, the present technology, for example, is stored as an application 424 or module 426 in memory locations within RAM 408 and memory areas within data storage unit 412. The present technology may be applied to one or more elements of described system 400. For example, a method of modifying user interface 225A of device 115A may be applied to operating system 422, applications 424, modules 426, and/or data 428.

System 400 also includes one or more signal generating and receiving device(s) 430 coupled with bus 404 for enabling system 400 to interface with other electronic devices and computer systems. Signal generating and receiving device(s) 430 of the present embodiment may include wired serial adaptors, modems, and network adaptors, wireless modems, and wireless network adaptors, and other such communication technology. The signal generating and receiving device(s) 430 may work in conjunction with one or more communication interface(s) 432 for coupling information to and/or from system 400. Communication interface 432 may include a serial port, parallel port, Universal Serial Bus (USB), Ethernet port, antenna, or other input/output interface. Communication interface 432 may physically, electrically, optically, or wirelessly (e.g. via radio frequency) couple system 400 with another device, such as a cellular telephone, radio, or computer system.

The computing system 400 is only one example of a suitable computing environment and is not intended to suggest any limitation as to the scope of use or functionality of the present technology. Neither should the computing environment 400 be interpreted as having any dependency or requirement relating to any one or combination of components illustrated in the example computing system 400.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

What is claimed is:

1. A method, performed by an intermediate device, for prevention of malware infection of a user device, the method comprising:
   receiving, from a browser operating on the user device, a first request for a first web page associated with an Internet web site, the browser being capable of rendering the first web page;
   transmitting, to a website associated with the requested first web page and in response to the first request, a second request for the first web page;
   receiving, responsive to the second request, a first set of data associated with the first web page, the first set of data being in a code domain format;
   generating, based on the first set of data in the code domain format, a first set of images, the first set of images representing only all the renderable data of the first set of data in an image format, said generating of said first set of images performed without knowledge of a location or a presence of said malware infection, or code corresponding to said malware infection, within said first set of data in said code domain format, wherein said generating of said first set of images is performed without requiring a malware detection process; and
   transmitting, to the browser, in place of the first web page, the first set of images with correlation data configured to enable a user to interact with the first set of images on the user device in a manner that is substantially the same as though the user device had received the first web page in the code domain format and the first web page had been rendered from the code domain format by the browser, wherein said method, performed by said intermediate device, for said prevention of said malware infection of said user device is entirely accomplished via code isolation.

2. The method of claim 1, further comprising:
   receiving, from the browser, a command for interacting with the first web page;
   forwarding the command to the web site for execution;
   receiving, in response to the forwarded command, a second set of data associated with a second web page, the second set of data being in the code domain format;
   generating, based on the second set of data, a second set of images, the second set of images representing all the renderable data of the second set of data in the image format, said generating of said second set of images performed without knowledge of a location or a presence of said malware infection, or said code corresponding to said malware infection, within said second set of data in said code domain format; and
   transmitting, to the browser, in place of the second web page, the second set of images with correlation data configured to enable a user to interact with the second set of images on the user device in a manner that is substantially the same as though the user device had received the second web page in the code domain format and the second web page had been rendered from the code domain format by the program operating on the user device.

3. The method of claim 1, further comprising:
   receiving, from the browser, a user input to the first web page; and
   forwarding, to the web site, the user input.

4. The method of claim 1, wherein:
   receiving, from the browser, a first request for a first web page associated with an Internet web site, comprises receiving the first request over a first interface; and
   transmitting, to the browser, the first set of images comprises transmitting the first set of images over a second interface, separate from the first interface.

5. The method of claim 1, wherein generating the first set of images comprises rendering all the renderable data of the first web page in an image format.

6. The method of claim 1, wherein the first set of images comprises at least a first image correlated with a first hyperlink on the first web page and a second image being correlated with a second hyperlink on the first web page.

7. A method, performed by an intermediate device, for prevention of malware infection of a user device, the method comprising:
receiving, from a browser operating on the user device, a first request for a first web page;
comparing the web site against a safe list;
if the web site is on the safe list:
requesting the first web page;
receiving the first web page; and
transmitting the first web page to the browser; and
if the web site is not on the safe list:
transmitting, to a website associated with the requested first web page and in response to the first request, a second request for the first web page;
receiving, responsive to the second request, a first set of data associated with the first web page, the first set of data being in a code domain format;
generating, based on the first set of data in the code domain format, a first set of images, the first set of images representing only all the renderable data of the first set of data in an image format, said generating of said first set of images performed without knowledge of a location or a presence of said malware infection, or code corresponding to said malware infection, within said first set of data in said code domain format, wherein said generating, based on said first set of data, of said first set of images is performed without requiring a malware detection process; and
transmitting, to the browser, the first set of images with correlation data configured to enable a user to interact with the first set of images on the user device in a manner that is substantially the same as though the user device had received the first web page in the code domain format and the first web page had been rendered from the code domain format by the browser, such that said user device is protected from said malware infection, wherein said method, performed by said intermediate device, for said prevention of said malware infection of said user device is entirely accomplished via code isolation.

8. The method of claim 7, further comprising:
receiving, from the browser, a command for interacting with the first web page;
forwarding the command to the web site for execution;
receiving, in response to the forwarded command, a second set of data associated with a second web page, the second set of data being in the code domain format; and
if the web site is not on the safe list:
generating, based on the second set of data, a second set of images, the second set of images representing all the renderable data of the second set of data in the image format, wherein said generating of said second set of images is performed without knowledge of a location or a presence of said malware infection, or said code corresponding to said malware infection, within said second set of data in said code domain format; and
transmitting, to the browser, in place of the second web page, the second set of images with correlation data configured to enable a user to interact with the second set of images on the user device in a manner that is substantially the same as though the user device had received the second web page in the code domain format and the second web page had been rendered from the code domain format by the program operating on the user device, such that said user device is protected from said malware infection.

9. The method of claim 7, further comprising:
receiving, from the browser, a user input to the first web page; and
forwarding, to the web site, the user input.

10. The method of claim 7, wherein:
receiving, from the browser, a first request for a first web page, comprises receiving the first request over a first interface; and
transmitting, to the browser, the first set of images comprises transmitting the first set of images over a second interface, separate from the first interface.

11. The method of claim 7, wherein the first set of images comprises at least a first image correlated with a first hyperlink on the first web page and a second image being correlated with a second hyperlink on the first web page.

12. The method of claim 7, wherein generating images comprises rendering all the renderable data of the first web page in a video format.

13. A method, performed by an intermediate device, for prevention of malware infection of a user device, the method comprising:
receiving, from the user device, a request for an executable component;
transmitting, to a website associated with the executable component and in response to the first request, a second request for the executable component;
receiving, responsive to the second request, a first set of data associated with the executable component, the first set of data being in a code domain format;
rendering the first set of data to generate a first set of images, the first set of images representing only all the renderable data of the first set of data in an image format, wherein said rendering of said first set of data to generate said first set of images is performed without knowledge of a location or a presence of said malware infection, or code corresponding to said malware infection, within said first set of data in said code domain format, wherein said rendering of said first set of data to generate said first set of images is performed without requiring a malware detection process; and
transmitting, to the user device, in place of the executable component, the first set of images with correlation data configured to enable a user to interact with the first set of images on the user device in a manner that is substantially the same as though the user device had received the executable component in the code domain format and the executable component had been rendered from the code domain format by the browser, such that said user device is protected from said malware infection, wherein said method, performed by said intermediate device, for said prevention of said malware infection of said user device is entirely accomplished via code isolation.

14. The method of claim 13, wherein:
receiving, from the user device, a request for an executable component, comprises receiving the request over a first interface; and
transmitting, to the user device, the first set of images comprises transmitting the first set of images over a second interface, separate from the first interface.

15. The method of claim 13, wherein the first set of images comprises at least a first image correlated with a first hyperlink on the first web page and a second image being correlated with a second hyperlink on the first web page.

16. The method of claim 13, wherein rendering the executable component to generate the first set of images comprises rendering the executable component in an image format.

17. A method, performed by an intermediate device residing on a network, for protecting a user device on the network from executing malicious code, the method comprising:
receiving, from the user device, a first request for a first web page associated with an Internet web site;
transmitting, over the network, to a website associated with the requested first web page and in response to the first request, a second request for the first web page;
receiving, responsive to the second request, a first set of data associated with the requested first web page, the first set of data being in a code domain format, wherein said malicious code exists in said first set of data;
generating, based on the first set of data in the code domain format, a first set of images, the first set of images representing only all the renderable data of the first set of data in an image format, wherein said generating of said first set of images is performed without knowledge of a location or a presence of said malicious code within said first set of data in said code domain format, wherein said generating, based on said first set of data in said code domain format, of said first set of images is performed without requiring a malicious code detection process; and
transmitting, to the user device, the first set of images with correlation data configured to enable a user to interact with the first set of images on the user device in a manner that is substantially the same as though the user device had received the first web page in the code domain format and the first web page had been rendered from the code domain format by a program operating on the user device, such that said user device on said network is protected by preventing said user device from said executing of said malicious code, wherein said method, performed by said intermediate device residing on said network, for protecting said user device on said network from said executing of said malicious code is entirely accomplished via code isolation.

18. The method of claim 17, wherein the correlation data comprises an HTML image map correlating the first set of images to the first web page.

19. The method of claim 18, wherein the HTML image map is wrapped in a frame compatible with the browser operating on the user device.

20. The method of claim 17, further comprising:
receiving, from the user device, a command for interacting with the first web page;
forwarding, over the network, the command to the web site for execution;
receiving, over the network in response to the forwarded command, a second set of data associated with a second web page;
generating, based on the second set of data, a second set of images, the second set of images representing all the renderable data of the second set of data in the image format, wherein said generating of said second set of images is performed without knowledge of a location or a presence of said malicious code within said second set of data in said code domain format; and
transmitting, to the user device, in place of the second web page, the second set of images with correlation data configured to enable a user to interact with the second set of images on the user device in a manner that is substantially the same as though the user device had received the second web page in the code domain format and the second web page had been rendered from the code domain format by the program operating on the user device, such that said user device on said network is protected by preventing said user device from said executing of said malicious code.

21. The method of claim 17, wherein:
receiving, from the user device, a first request for a first web page associated with an Internet web site, comprises receiving the first request over a first interface; and
transmitting, to the user device, the first set of images comprises transmitting the first set of images over a second interface, separate from the first interface.

22. The method of claim 17, wherein generating, based on the first set of data in the code domain format, a first set of images comprises rendering all the renderable data of the first web page in an image format.

23. The method of claim 17, wherein the first set of images comprises at least a first image correlated with a first hyperlink on the first web page and a second image being correlated with a second hyperlink on the first web page.

24. A method, performed by an intermediate device residing on a network, for protecting a user device on the network from executing malicious code, the method further comprising:
receiving, from the user device, a first request for a first web page associated with an Internet web site;
comparing the web site against a safe list;
if the web site is on the safe list:
requesting, over the network, the first web page;
receiving, over the network, the first web page; and
transmitting the first web page to the user device; and
if the web site is not on the safe list:
transmitting, over the network, to the web site and in response to the first request, a second request for the first web page;
receiving, responsive to the second request, a first set of data associated with the requested first web page, the first set of data being in a code domain format, wherein said malicious code exists in said first set of data;
generating, based on the first set of data in the code domain format, a first set of images, the first set of images representing only all the renderable data of the first set of data in an image format, wherein said generating of said first set of images is performed without knowledge of a location or a presence of said malicious code within said first set of data in said code domain format, wherein said generating, based on said first set of data in said code domain format, of said first set of images is performed without requiring a malicious code detection process; and
transmitting, to the user device, the first set of images with correlation data configured to enable a user to interact with the first set of images on the user device in a manner that is substantially the same as though the user device had received the first web page in the code domain format and the first web page had been rendered from the code domain format by a program operating on the user device, such that said user device on said network is protected by preventing said user device from said executing of said malicious code, wherein said method, performed by said intermediate device residing on said network, for said protecting said user device on said network from executing said malicious code is entirely accomplished via code isolation.

* * * * *